United States Patent
Moraites et al.

(10) Patent No.: US 10,156,429 B2
(45) Date of Patent: Dec. 18, 2018

(54) VISUAL DISRUPTION NETWORK, AND SYSTEM, METHOD, AND COMPUTER PROGRAM PRODUCT THEREOF

(71) Applicant: Lockheed Martin Corporation, Bethesda, MD (US)

(72) Inventors: Stephen C. Moraites, Owego, NY (US); Carl R. Herman, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/658,030

(22) Filed: Jul. 24, 2017

(65) Prior Publication Data

US 2017/0336177 A1     Nov. 23, 2017

Related U.S. Application Data

(63) Continuation of application No. 13/527,134, filed on Jun. 19, 2012, now Pat. No. 9,714,815.

(51) Int. Cl.

| | |
|---|---|
| *G01S 7/495* | (2006.01) |
| *F41H 13/00* | (2006.01) |
| *B64D 45/00* | (2006.01) |
| *F41H 11/02* | (2006.01) |
| *G01S 5/00* | (2006.01) |

(52) U.S. Cl.
CPC ......... *F41H 13/0056* (2013.01); *B64D 45/00* (2013.01); *F41H 11/02* (2013.01); *G01S 5/00* (2013.01)

(58) Field of Classification Search
CPC .... G01S 7/4802; G01S 7/4811; G01S 7/4818; G01S 7/495; G01S 13/78; G01S 13/86;
(Continued)

(56) References Cited

U.S. PATENT DOCUMENTS

| | | | |
|---|---|---|---|
| 3,445,808 A | 5/1969 | Johnson | |
| 3,699,341 A | 10/1972 | Quillinan et al. | |

(Continued)

FOREIGN PATENT DOCUMENTS

| | | | |
|---|---|---|---|
| EP | 0627086 A1 | 8/1993 | |
| EP | 655139 B1 | 5/1995 | |

(Continued)

OTHER PUBLICATIONS

Dowling, Dave, PMA 272 Presentation for 2010 AAAA Aircraft Survivability Symposium "One Team—One Fight—One Future"/ "Moving Forward on Naval Rotary Wing Integrated ASE" Laying the Framework for the Future, Nov. 17, 2010, 28 pages.

(Continued)

*Primary Examiner* — Phillip A Johnston
*Assistant Examiner* — Hsien Tsai
(74) *Attorney, Agent, or Firm* — Miles & Stockbridge PC

(57) ABSTRACT

Aspects of the disclosed subject matter involve an airborne-based network for implementing a laser-based visual disruption countermeasure scan pattern system, method, and computer program product. The scan pattern can be comprised of a plurality of lasers each with their own scan pattern and may be used to disrupt an optical system of a weapon or an individual. One vehicle in the network can transmit target information and/or scan information to one or more other vehicles or to a non-vehicle remote location in the network.

12 Claims, 8 Drawing Sheets

(58) Field of Classification Search
CPC .......... G01S 13/89; G01S 13/42; G01S 13/58;
G01S 13/66; G01S 13/74; G01S 13/023;
F41H 13/0056; F41G 7/346; F41G 7/36;
F41G 7/007; F41G 3/02; F41G 3/04
See application file for complete search history.

(56) References Cited

U.S. PATENT DOCUMENTS

| | | |
|---|---|---|
| 3,870,995 A | 3/1975 | Nielson |
| 3,897,150 A | 7/1975 | Bridges et al. |
| 3,905,035 A | 9/1975 | Krumboltz et al. |
| 3,944,167 A | 3/1976 | Figler et al. |
| 3,964,695 A | 6/1976 | Harris |
| 4,093,154 A | 6/1978 | McLean |
| 4,160,974 A | 7/1979 | Stavis |
| 4,290,364 A | 9/1981 | Weidenhagen et al. |
| 4,323,993 A | 4/1982 | Soderblom et al. |
| 4,342,032 A | 7/1982 | Roesch et al. |
| 4,460,240 A | 7/1984 | Hudson |
| 4,647,759 A | 3/1987 | Worsham et al. |
| 4,739,329 A | 4/1988 | Ward et al. |
| 4,744,761 A | 5/1988 | Doerfel et al. |
| 4,796,834 A | 1/1989 | Ahlstrom |
| 4,813,877 A | 3/1989 | Sanctuary et al. |
| 4,855,932 A | 8/1989 | Cangiani |
| 4,964,723 A | 10/1990 | Margue et al. |
| 4,990,920 A | 2/1991 | Sanders, Jr. |
| 5,042,743 A | 8/1991 | Carney |
| 5,066,956 A | 11/1991 | Martin |
| 5,122,801 A | 6/1992 | Hughes |
| 5,123,327 A | 6/1992 | Alston et al. |
| 5,231,480 A | 7/1993 | Ulich |
| 5,233,541 A | 8/1993 | Corwin et al. |
| 5,241,518 A | 8/1993 | McNelis et al. |
| 5,287,110 A | 2/1994 | Tran |
| 5,292,195 A | 3/1994 | Crisman, Jr. |
| 5,300,780 A | 4/1994 | Denney |
| 5,347,910 A | 9/1994 | Avila et al. |
| 5,371,581 A | 12/1994 | Wangler et al. |
| 5,415,548 A | 5/1995 | Adams |
| 5,430,810 A | 7/1995 | Saeki |
| 5,461,571 A | 10/1995 | Tran |
| 5,549,477 A | 8/1996 | Tran et al. |
| 5,579,009 A | 11/1996 | Nilsson-Almqvist et al. |
| 5,600,434 A | 2/1997 | Warm |
| 5,637,866 A | 6/1997 | Riener et al. |
| 5,685,636 A * | 11/1997 | German .............. F21V 33/0064 |
| | | 361/232 |
| 5,719,797 A | 2/1998 | Sevachko |
| 5,742,384 A | 4/1998 | Farmer |
| 5,808,226 A | 9/1998 | Allen et al. |
| 5,837,918 A * | 11/1998 | Sepp .................. F41H 13/0056 |
| | | 42/106 |
| 5,850,285 A | 12/1998 | Hill, Jr. |
| 5,945,926 A | 8/1999 | Ammar et al. |
| 5,969,676 A | 10/1999 | Tran et al. |
| 5,988,645 A | 11/1999 | Downing |
| 5,992,288 A | 11/1999 | Barnes |
| 5,999,130 A | 12/1999 | Snow et al. |
| 6,057,915 A | 5/2000 | Squire et al. |
| 6,078,681 A | 6/2000 | Silver |
| 6,137,436 A | 10/2000 | Koch |
| 6,196,497 B1 | 3/2001 | Lankes et al. |
| 6,212,471 B1 | 4/2001 | Stiles et al. |
| 6,222,464 B1 | 4/2001 | Tinkel et al. |
| 6,410,897 B1 | 6/2002 | O'Neill |
| 6,489,915 B1 | 12/2002 | Lines et al. |
| 6,498,580 B1 | 12/2002 | Bradford |
| 6,621,764 B1 | 9/2003 | Smith |
| 6,650,407 B2 | 11/2003 | Jamieson et al. |
| 6,669,477 B2 | 12/2003 | Hulet |
| 6,693,561 B2 | 2/2004 | Kaplan |
| 6,707,052 B1 | 3/2004 | Wild et al. |
| 6,723,975 B2 | 4/2004 | Saccomanno |
| 6,734,824 B2 | 5/2004 | Herman |
| 6,741,341 B2 | 5/2004 | DeFlumere |
| 6,796,213 B1 | 9/2004 | McKendree |
| 6,822,583 B2 | 11/2004 | Yannone et al. |
| 6,825,791 B2 | 11/2004 | Sanders et al. |
| 6,836,320 B2 | 12/2004 | DeFlumere et al. |
| 6,945,780 B2 | 9/2005 | Perry |
| 6,952,001 B2 | 10/2005 | McKendree et al. |
| 6,956,523 B2 | 10/2005 | Mohan |
| 6,969,845 B2 | 11/2005 | Von Rosenberg, Jr. |
| 6,980,152 B2 | 12/2005 | Steadman et al. |
| 6,985,212 B2 | 1/2006 | Jamieson et al. |
| 6,995,660 B2 | 2/2006 | Yannone et al. |
| 7,026,600 B2 | 4/2006 | Jamieson et al. |
| 7,035,308 B1 | 4/2006 | McNeil et al. |
| 7,047,861 B2 | 5/2006 | Solomon |
| 7,110,880 B2 | 9/2006 | Breed et al. |
| 7,126,877 B2 | 10/2006 | Barger et al. |
| 7,132,928 B2 | 11/2006 | Perricone |
| 7,193,691 B2 | 3/2007 | Weber |
| 7,205,520 B1 * | 4/2007 | Busse .................. F41H 11/02 |
| | | 250/203.6 |
| 7,219,086 B2 | 5/2007 | Geshwind |
| 7,282,695 B2 | 10/2007 | Weber et al. |
| 7,333,047 B2 | 2/2008 | Fullerton et al. |
| 7,359,285 B2 | 4/2008 | Barger et al. |
| 7,378,626 B2 | 5/2008 | Fetterly |
| 7,379,845 B2 | 5/2008 | Gorinevsky et al. |
| 7,504,982 B2 | 3/2009 | Berg et al. |
| 7,609,156 B2 | 10/2009 | Mullen |
| 7,654,185 B1 | 2/2010 | Yannone |
| 7,688,247 B2 | 3/2010 | Anschel et al. |
| 7,690,291 B2 | 4/2010 | Quinn |
| 7,696,919 B2 | 4/2010 | Moraites |
| 7,710,278 B2 | 5/2010 | Holmes et al. |
| 7,710,828 B2 | 5/2010 | Barger et al. |
| 7,755,495 B2 | 7/2010 | Baxter et al. |
| 7,765,083 B2 | 7/2010 | Zank et al. |
| 7,769,502 B2 | 8/2010 | Herman |
| 7,787,331 B2 | 8/2010 | Barger et al. |
| 7,830,299 B2 | 11/2010 | Steele et al. |
| 7,848,879 B2 | 12/2010 | Herman |
| 7,870,816 B1 | 1/2011 | Willingham et al. |
| 7,925,159 B2 | 4/2011 | Dove |
| 7,973,658 B2 | 7/2011 | Parish et al. |
| 8,009,515 B2 | 8/2011 | Cecala et al. |
| 8,013,302 B2 | 9/2011 | Meir |
| 8,025,230 B2 | 9/2011 | Moraites et al. |
| 8,164,037 B2 * | 4/2012 | Jenkins .................. F41G 7/008 |
| | | 244/3.1 |
| 8,258,998 B2 | 9/2012 | Factor |
| 9,103,628 B1 | 8/2015 | Moraites et al. |
| 9,146,251 B2 | 9/2015 | Moraites et al. |
| 9,170,070 B2 * | 10/2015 | Sharpin .................. F41H 11/02 |
| 9,196,041 B2 | 11/2015 | Moraites et al. |
| 9,360,370 B2 | 6/2016 | Moraites et al. |
| 2002/0064760 A1 | 5/2002 | Lazecki et al. |
| 2003/0008265 A1 | 1/2003 | Hulet |
| 2004/0027257 A1 | 2/2004 | Yannone et al. |
| 2004/0030570 A1 | 2/2004 | Solomon |
| 2004/0183679 A1 | 9/2004 | Paximadis |
| 2005/0012657 A1 | 1/2005 | Mohan |
| 2005/0065668 A1 | 3/2005 | Sanghera et al. |
| 2005/0150371 A1 | 7/2005 | Rickard |
| 2005/0224706 A1 | 10/2005 | Von Rosenberg, Jr. |
| 2006/0000988 A1 | 1/2006 | Stuart et al. |
| 2006/0017939 A1 | 1/2006 | Jamieson et al. |
| 2006/0021498 A1 | 2/2006 | Moroz et al. |
| 2006/0044941 A1 | 3/2006 | Barger |
| 2006/0163446 A1 | 7/2006 | Guyer et al. |
| 2006/0242186 A1 | 10/2006 | Hurley |
| 2007/0040062 A1 | 2/2007 | Lau et al. |
| 2007/0092109 A1 | 4/2007 | Lee |
| 2007/0125951 A1 | 6/2007 | Snider et al. |
| 2007/0144396 A1 | 6/2007 | Hamel et al. |
| 2007/0201015 A1 | 8/2007 | Gidseg et al. |
| 2007/0206177 A1 | 9/2007 | Anschel et al. |
| 2007/0219720 A1 | 9/2007 | Trepagnier |
| 2007/0236382 A1 | 10/2007 | Dove |
| 2008/0018520 A1 | 1/2008 | Moreau |

(56) References Cited

U.S. PATENT DOCUMENTS

| | | | |
|---|---|---|---|
| 2008/0074306 A1 | 3/2008 | Akerlund | |
| 2008/0133070 A1 | 6/2008 | Herman | |
| 2008/0191926 A1 | 8/2008 | Benayahu et al. | |
| 2008/0206718 A1 | 8/2008 | Jaklitsch et al. | |
| 2008/0291075 A1 | 11/2008 | Rapanotti | |
| 2008/0314234 A1 | 12/2008 | Boyd et al. | |
| 2009/0051510 A1 | 2/2009 | Follmer et al. | |
| 2009/0087029 A1 | 4/2009 | Coleman et al. | |
| 2009/0173788 A1 | 7/2009 | Moraites et al. | |
| 2009/0174589 A1 | 7/2009 | Moraites | |
| 2009/0189785 A1 | 7/2009 | Kravitz et al. | |
| 2009/0219393 A1 | 9/2009 | Vian et al. | |
| 2009/0224958 A1* | 9/2009 | Aphek | F41G 7/224 342/54 |
| 2009/0226109 A1 | 9/2009 | Warren et al. | |
| 2009/0236422 A1 | 9/2009 | Kleder | |
| 2009/0250634 A1 | 10/2009 | Chicklis et al. | |
| 2009/0321636 A1 | 12/2009 | Ragucci et al. | |
| 2009/0322584 A1 | 12/2009 | Herman | |
| 2010/0026554 A1 | 2/2010 | Longman et al. | |
| 2010/0117888 A1 | 5/2010 | Simon | |
| 2010/0135120 A1 | 6/2010 | Cecala et al. | |
| 2010/0253567 A1 | 10/2010 | Factor et al. | |
| 2010/0278347 A1 | 11/2010 | Succi et al. | |
| 2011/0001062 A1 | 1/2011 | Herman et al. | |
| 2011/0010025 A1 | 1/2011 | Eu et al. | |
| 2011/0196551 A1 | 8/2011 | Lees et al. | |
| 2012/0174768 A1 | 7/2012 | Spransy | |
| 2012/0211562 A1 | 8/2012 | Cook | |
| 2013/0201052 A1 | 8/2013 | Saint Clair | |
| 2015/0285902 A1 | 10/2015 | Moraites et al. | |
| 2015/0293212 A1 | 10/2015 | Moraites et al. | |
| 2015/0310627 A1 | 10/2015 | Moraites et al. | |
| 2015/0377709 A1 | 12/2015 | Moraites et al. | |
| 2016/0298940 A1 | 10/2016 | Moraites et al. | |
| 2016/0298941 A1 | 10/2016 | Moraites et al. | |
| 2016/0321798 A1 | 11/2016 | Moraites et al. | |

FOREIGN PATENT DOCUMENTS

| | | |
|---|---|---|
| EP | 2 239 595 A2 | 10/2010 |
| JP | 2001-091650 A | 4/2001 |
| WO | WO 92/19982 A1 | 11/1992 |
| WO | WO 93/16395 | 8/1993 |
| WO | WO 94/04939 A1 | 3/1994 |
| WO | WO 2004/046750 A2 | 6/2004 |
| WO | WO 2005/024751 A1 | 3/2005 |

OTHER PUBLICATIONS

Notice of Allowance in U.S. Appl. No. 13/826,176 dated May 4, 2015.
Nonfinal Office Action in U.S. Appl. No. 13/804,791 dated Mar. 18, 2015.
Nonfinal Office Action in U.S. Appl. No. 13/804,513 dated Mar. 19, 2015.
Final Office Action in U.S. Appl. No. 13/804,513 dated May 19, 2015.
Final Office Action in U.S. Appl. No. 13/804,791, dated May 27, 2015.
Nonfinal Office Action in U.S. Appl. No. 14/709,634, dated Jun. 9, 2015.
Notice of Allowance in U.S. Appl. No. 13/804,791, dated Jun. 22, 2015.
Notice of Allowance in U.S. Appl. No. 13/804,513, dated Jul. 23, 2015.
Notice of Allowance in U.S. Appl. No. 14/709,634, dated Feb. 1, 2016.
Nonfinal Office Action in U.S. Appl. No. 13/527,134, dated Jul. 21, 2016.
Nonfinal Office Action in U.S. Appl. No. 14/789,925, dated Jul. 22, 2016.
Notice of Allowance in U.S. Appl. No. 14/789,761, dated Jul. 29, 2016.
Nonfinal Office Action in U.S. Appl. No. 13/527,056, dated Jul. 29, 2016.
Nonfinal Office Action in U.S. Appl. No. 15/191,325, dated Sep. 12, 2016.
Nonfinal Office Action in U.S. Appl. No. 15/191,373, dated Sep. 12, 2016.
Notice of Allowance in U.S. Appl. No. 14/789,761, dated Sep. 30, 2016.
Final Office Action in U.S. Appl. No. 14/789,925, dated Nov. 7, 2016.
Nonfinal Office Action in U.S. Appl. No. 15/157,174, dated Nov. 25, 2016.
Final Office Action in U.S. Appl. No. 13/527,134, dated Dec. 12, 2016.
Notice of Allowance in U.S. Appl. No. 13/527,056, dated Dec. 14, 2016.
Notice of Allowance in U.S. Appl. No. 14/789,925, dated Feb. 2, 2017.
Notice of Allowance in U.S. Appl. No. 15/157,174, dated Mar. 8, 2017.
Notice of Allowance in U.S. Appl. No. 13/527,134, dated Mar. 22, 2017.
Notice of Allowance in U.S. Appl. No. 15/191,373, dated Mar. 27, 2017.
Notice of Allowance in U.S. Appl. No. 15/191,325, dated Mar. 29, 2017.
Notice of Allowance dated May 23, 2018, in U.S. Appl. No. 15/664,894.
Notice of Allowance dated Aug. 9, 2018, in U.S. Appl. No. 15/664,933.

* cited by examiner

VISUAL DISRUPTION NETWORK, AND SYSTEM, METHOD, AND COMPUTER PROGRAM PRODUCT THEREOF

Embodiments relate generally to systems, methods, and computer program products for disrupting optical systems. In particular, embodiments involve systems, methods, and computer program products for optimizing a laser-based visual disruption countermeasure scan pattern. Embodiments also include networks involving laser-based visual disruption countermeasure systems, methods, and computer program products.

SUMMARY

Embodiments of the invention can include a laser-based visual disruption countermeasure system on-board a helicopter, the system comprising: a hostile fire indicator subsystem on-board the helicopter to identify locations of stationary or moving ground-based threats to the helicopter and to generate respective ground-projection zones around the identified locations indicative of possible error in the identified locations, each of the zones around the identified threat locations being in the form of an ellipse; and an eye-safe laser-based visual disruption subsystem on-board the helicopter to generate and output a plurality of laser beams with intensities sufficient to interfere with and temporarily impair a human optical system, each laser beam being output so as to follow a rectangular scan pattern completely enveloping a corresponding ellipse defining the zone indicating possible error in a corresponding identified threat location, irrespective of current position of the helicopter, said eye-safe laser-based visual disruption subsystem being operative to maintain at the same time two or more of the rectangular scan patterns. The system is configured and operative to determine whether any of the two or more rectangular scan patterns maintained at the same time overlap, and to increase applied laser beam energy only for any overlapping portion.

Increasing the applied laser beam energy for any overlapping portion may include one or more of increasing scanning frequency for only the overlapping portion or portions, and increasing intensity of one or more of the laser beams associated with the overlapping portion or portions. Optionally, the system is configured and operative to keep a same applied laser intensity for any non-overlapping portion of the two or more rectangular scan patterns while applying increased laser beam energy for the overlapping portion or portions, to reduce applied laser intensity for any non-overlapping portion of the two or more rectangular scan patterns while applying increased laser beam energy for the overlapping portion or portions, or to cease applied laser intensity for any non-overlapping portion of the two or more rectangular scan patterns upon application of increased laser beam energy for the overlapping portion or portions.

According to the system, optionally, the ground-projection zones around the identified locations can be defined based on respective positions along a flight path of the helicopter at which hostile fire associated with the ground-based threats occurred. Further, the stationary or moving ground-based threats may be human beings firing any one of a rocket-propelled grenade (RPG), anti-aircraft artillery (AAA), and small arms fire.

The present invention can also include an embodiment or embodiments involving a visual acquisition disruptor scanning system, comprising: means for defining multiple distinct threat regions associated with one or more known threats to a vehicle (e.g., an airborne vehicle); means for outputting a plurality of optical impairment signals that follow scan patterns based on corresponding distinct threat regions defined by the means for defining multiple distinct threat regions; and means for determining whether any of the defined distinct threat regions overlap. The means for outputting a plurality of optical impairment signals can be configured and operative to supply an increased amount of energy to any portion of the defined distinct threat regions determined to overlap.

The system can further comprise: means for identifying the one or more threats (e.g., ground-based); and means for estimating respective locations of the one or more identified threats, wherein the means for defining multiple distinct threat regions can be constructed and operative to define an uncertainty area around the respective locations of the one or more identified threats.

Optionally, the optical impairment signals may be output sequentially along a path of the vehicle (e.g., a flight path of an airborne vehicle). Further, each of the scan patterns may be a ground projection in the form of one of a square, a rectangle, an oval, a circle, an ellipse, a triangle, an octagon, a hexagon, or an asymmetric polygon. Additionally, optionally, the means for determining whether any of the defined distinct threat regions overlap is configured and operative to associate any overlap as a single threat.

One or more embodiments also are directed to a visual acquisition disruptor scan pattern method, comprising: electronically identifying a common portion of at least two different flash detection areas; and responsive to said electronically identifying, automatically applying in scanning fashion an increased amount of laser energy to the common portion.

In one or more embodiments, optionally, the automatically applying an increased amount of laser energy can include at least one of increasing scanning frequency of one or more lasers for the common portion and increasing intensity of one or more of lasers for the common portion. One or more methods according to embodiments may further comprise generating a plurality of different flash detection areas including said at least two different flash detection areas; and deploying a plurality of different laser scan patterns corresponding to the plurality of different flash detection areas, the number of different flash detection areas matching the number of different laser scan patterns, and each laser scan pattern enveloping its corresponding flash detection area.

Optionally, the plurality of different laser scan patterns are deployed sequentially, and the plurality of different laser scan patterns are maintained simultaneously. The automatically applying in scanning fashion an increased amount of laser energy to the common portion may be prior to any previous scan patterns for the at least two different flash detection areas having been deployed. Further, optionally, the increased amount of laser energy to the common portion can be of an amount sufficient to interfere with an optical system of a weapon or an optical system of a person. The method may be used or implemented with a ground-, water-, space-, or air-based vehicle.

Embodiments of the invention also include a laser-based visual disruption countermeasure network including a first helicopter and a second helicopter, comprising: a hostile fire indicator subsystem on-board the first helicopter to identify locations of stationary or moving ground-based threats to a second helicopter and to generate respective ground-projection zones around the identified locations indicative of possible error in the identified locations, each of the zones around the identified threat locations being in the form of an ellipse, said hostile fire indicator subsystem on-board the first helicopter being configured and operative to send data representative of the generated ground-projection zones to the second helicopter in a same general area as the first helicopter; and an eye-safe laser-based visual disruption subsystem on-board the second helicopter to generate and output a plurality of laser beams with intensities sufficient to interfere with and temporarily impair a human optical system, each laser beam being output so as to follow a rectangular scan pattern completely enveloping a corresponding ellipse defining the zone indicating possible error in a corresponding identified threat location, irrespective of current position of the second helicopter, said eye-safe laser-based visual disruption subsystem being operative to maintain at the same time two or more of the rectangular scan patterns. The network can be configured and operative to determine whether any of the two or more rectangular scan patterns maintained at the same time overlap, and to increase applied laser beam energy only for any overlapping portion.

In one or more embodiments, the network can further comprise an eye-safe laser-based visual disruption subsystem on-board the first helicopter to generate and output a plurality of laser beams with intensities sufficient to interfere with and temporarily impair a human optical system, each laser beam being output so as to follow a rectangular scan pattern completely enveloping a corresponding ellipse defining the zone indicating possible error in a corresponding identified threat location, irrespective of current position of the first helicopter, said eye-safe laser-based visual disruption subsystem being operative to maintain at the same time two or more of the rectangular scan patterns, wherein increasing applied laser beam energy for any overlapping portion includes application of laser beam energy from the eye-safe laser-based visual disruption subsystem on-board the first helicopter and the eye-safe laser-based visual disruption subsystem on-board the second helicopter at the same time.

Optionally, the increasing applied laser beam energy for any overlapping portion includes increasing scanning frequency for only the overlapping portion or portions, and/or increasing intensity of one or more of the laser beams associated with the overlapping portion or portions.

The ground-projection zones around the identified locations may be defined based on respective positions along a flight path of the first helicopter at which hostile fire associated with the ground-based threats occurred. Further, the stationary or moving ground-based threats can be human beings firing any one of a rocket-propelled grenade (RPG), anti-aircraft artillery (AAA), and small arms fire at the first helicopter.

Optionally, in one or more embodiments, the system may be configured and operative to keep a same amount of applied laser intensity for any non-overlapping portion of the two or more rectangular scan patterns while applying increased laser beam energy for the overlapping portion or portions. Alternatively, the system may be configured and operative to reduce applied laser intensity for any non-overlapping portion of the two or more rectangular scan patterns while applying increased laser beam energy for the overlapping portion or portions.

An embodiment or embodiments also include a visual acquisition disruptor scanning network, comprising: means for receiving at a vehicle (e.g., an airborne vehicle) data regarding previously defined multiple threat regions associated with one or more known threats (e.g., ground-based) to an other vehicle (e.g., airborne), the previously defined multiple threat regions being defined with respect to previous positions of the other vehicle; and means for outputting a plurality of optical impairment signals from the vehicle, the plurality of optical impairment signals following respective scan patterns based on previous scan patterns of the other vehicle corresponding to the previously defined multiple threat regions, the means for outputting a plurality of optical impairment signals being configured and operative to supply an increased amount of energy to any portion of the previously defined threat regions previously determined to overlap.

Optionally, the data regarding previously defined multiple threat regions can include an uncertainty area around respective locations of the one or more known threats to the another vehicle. Further, the optical impairment signals can be output simultaneously or substantially simultaneously from the means for outputting a plurality of optical impairment signals of the vehicle. In one or more embodiments, optionally, each said scan pattern may be a ground projection in the form of one of a square, a rectangle, an oval, a circle, an ellipse, a triangle, an octagon, a hexagon, or an asymmetric polygon. Optionally, the data regarding previously defined multiple threat regions associated with one or more known threats to another vehicle includes scan pattern data from previous scan patterns deployed by the other vehicle.

One or more embodiments can also include a visual acquisition disruptor scan pattern method, comprising: electronically receiving, from a remote location, information regarding a common portion of at least two different previously identified flash detection areas; and responsive to said electronically receiving, automatically applying in scanning fashion an amount of laser energy to the common portion.

Optionally, the automatically applying an amount of laser energy can include applying an increased amount of laser energy relative to an initial amount of energy applied by a vehicle at the remote location, the increased amount of laser energy including at least one of increasing scanning frequency of one or more lasers for the common portion and increasing intensity of one or more of lasers for the common portion. In one or more embodiments, the method can further comprise electronically receiving, from the remote location, information regarding a plurality of different flash detection areas including said at least two different flash detection areas; and deploying a plurality of different laser scan patterns corresponding to the plurality of different flash detection areas, the number of different flash detection areas matching the number of different laser scan patterns, and each laser scan pattern enveloping its corresponding flash detection area.

For one or more embodiments, optionally, the plurality of different laser scan patterns may be deployed simultaneously or substantially simultaneously, and/or the plurality of different laser scan patterns can be maintained substantially for a same amount of time. Further, optionally, the automatically applying in scanning fashion an amount of laser energy to the common portion may be prior to any previous scanning associated with the location of said electronically receiving from the remote location. In embodiments, the amount of laser energy to the common portion is of an amount sufficient to interfere with an optical system of a weapon or an optical system of a person. The remote location may be associated with one of a ground-, water-, space-, or air-based vehicle.

Additionally, in one or more embodiments, scan pattern and/or threat location data can be stored for later use, for example, during a next mission or returning from a mission.

Accordingly, scan patterns as set forth herein can be automatically deployed based on stored scan pattern and/or threat location data as the vehicle reenters corresponding areas or zones where threats locations were previously identified and/or scan patterns previously deployed.

Embodiments also include computer program products or non-transitory computer readable media that can perform some or all aspects or functionality of methods, circuitry, circuits, systems, or system components as set forth herein and according to embodiments of the invention.

For instance, embodiments of the invention can include a computer program product in the form of a non-transitory computer readable storage medium having stored thereon software instructions that, when executed by a processor, cause the processor to perform operations comprising: electronically receiving, from a remote location, information regarding a common portion of at least two different previously identified flash detection areas; and responsive to said electronically receiving, automatically applying in scanning fashion an amount of laser energy to the common portion. As another example, embodiments of the invention can include a computer program product in the form of a non-transitory computer readable storage medium having stored thereon software instructions that, when executed by a processor, cause the processor to perform operations comprising: electronically identifying a common portion of at least two different flash detection areas; and responsive to said electronically identifying, automatically applying in scanning fashion an increased amount of laser energy to the common portion.

BRIEF DESCRIPTION OF THE DRAWINGS

Embodiments will hereinafter be described in detail below with reference to the accompanying drawings, wherein like reference numerals represent like elements. The accompanying drawings have not necessarily been drawn to scale. Any values dimensions illustrated in the accompanying graphs and figures are for illustration purposes only and may not represent actual or preferred values or dimensions. Where applicable, some features may not be illustrated to assist in the description of underlying features.

DESCRIPTION

Figure 1:
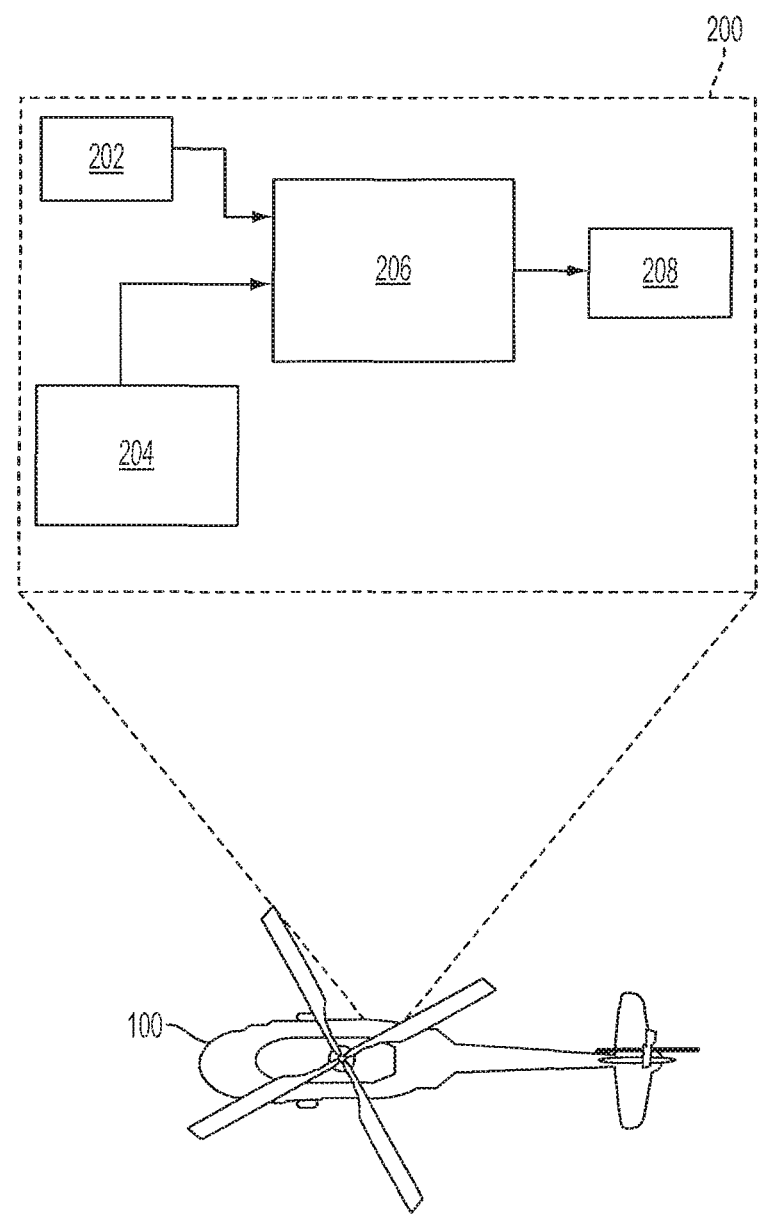
FIG. 1 is a block diagram a system according to one or more embodiments of the invention.

The description set forth below in connection with the appended drawings is intended as a description of various embodiments of the disclosed subject matter and is not intended to represent the only embodiments in which the disclosed subject matter may be practiced. In certain instances, the description includes specific details for the purpose of providing a thorough understanding of the disclosed subject matter. However, it will be apparent to those skilled in the art that the disclosed subject matter may be practiced with or without these specific details. In some instances, structures and components may be shown in block diagram form in order to avoid obscuring the concepts of the disclosed subject matter.

Generally speaking, the invention relates to systems, methods, computer program products and networks thereof, on board a vehicle, for protecting the vehicle or other vehicles, for instance, aircraft, from optically or visually aimed threats located on the "ground." The terminology on the ground can include on soil, grass, etc. or in or on a building or some other man-made structure, vehicle, or natural feature that extends from the ground, or even into the ground. The terms "visually" and "optically" can refer to the use of light in the visible and near visible spectrum (e.g., IR and UV). Accordingly, an optically or visually aimed threat can be a threat to a vehicle that targets the vehicle via emission or reflection of visible, IR, or UV light from the vehicle. Examples of optically or visually aimed threats include a human aiming small arms fire, a rocket-propelled grenade (RPG), anti-aircraft artillery (AAA), or the like. Weapons with optical sensors also can be considered optically aimed threats.

Thus, embodiments of the invention can include optical countermeasure systems, methods, computer program products and networks thereof, implemented on a vehicle or vehicles, to interfere with and/or damage, one or both of optical sensors and human vision within a scan pattern or patterns thereof. Optionally, the optical countermeasure system, method, computer program product and network thereof can be laser-based, for instance, a dazzler or visual acquisition disrupter (VAD) that outputs one or more laser beams to engage detected or known optically or visually trained threats.

For instance, one or more embodiments of the invention involve airborne-based systems, methods, and computer program products for optimizing a laser-based visual disruption countermeasure scan pattern. The scan pattern can be comprised of a plurality of lasers each with their own scan pattern and may be used to disrupt an optical system of a weapon or an individual. Based on the scan patterns or data used to generate the scan patterns, the scan pattern can be focused on a particular area or zone associated with the scan patterns or data.

Additionally, one or more embodiments of the invention involve a network for implementing a laser-based visual disruption countermeasure scan pattern system, method, and computer program product. The scan pattern can be comprised of a plurality of lasers each with their own scan pattern and may be used to disrupt an optical system of a weapon or an individual. One vehicle in the network can transmit target information and/or scan information to one or more other ground- and/or air-based vehicles or to a non-vehicle remote location in the network. Thus, the network can be comprised of a plurality of scan patterns from only one vehicle, or, optionally, of one or more scan patterns from one vehicle and one or more additional scan patterns from one or more additional vehicles.

One or more embodiments of the invention can include a method of determining a scan pattern of an airborne optical disruption system, such as a Visual Acquisition Disruptor (VAD) eye-safe laser system or a dazzler, to counter stationary and/or moving ground-based optically aimed gunfire threats in military, law enforcement, and private security operational environments. The method can use results of platform sensing data, such as hostile fire indication systems or devices, to define regions on the ground in which threats are located or are likely located. The location data may be imprecise location data, and, as such, the platform sensing subsystems may not define exact threat locations, but rather with error zones or areas in the form of ellipses, for instance. Accordingly, the method can use multiple ground projected regions as the basis for the optical disruption system scan pattern to provide threat coverage by the optical disruption system. When projected on the ground, error zones can define potentially complex regions that encompass all or a predetermined amount of possible threat locations. For an airborne based system, for instance, these error zones can change orientation as the aircraft moves. In one or more embodiments of the invention, the method can apply countermeasure resources to known threat areas while increasing the amount of energy in regions with the highest likelihood of containing the threat.

In one embodiment, a visual acquisition disruptor scanning system may comprise means for defining multiple distinct threat regions associated with one or more known ground-based threats to an airborne vehicle; means for outputting a plurality of optical impairment signals that follow scan patterns based on corresponding distinct threat regions defined by said means for defining multiple distinct threat regions; and means for determining whether any of the defined distinct threat regions overlap. Optionally, the system may comprise means for identifying the one or more ground-based threats; and means for estimating respective locations of the one or more identified ground-based threats.

The means for identifying the one or more ground-based threats may comprise one or more electronic sensors or receivers to detect threat-related characteristics, such as a muzzle flash, an acoustic signal from a fired projectile, a heat signature of a fired projectile, etc. The means for identifying the one or more ground-based threats may also comprise a dedicated processor. Optionally or alternatively, the means for identifying the one or more ground-based threats may operate with or be comprised of a non-dedicated processor. Further, the means for identifying the one or more ground-based threats may be comprised of or be operative with vehicle-specific sensors and subsystems, such as navigation sensors and subsystems and/or communications components and circuitry (e.g., transceivers, processors, antennas, etc.).

The means for estimating respective locations of the one or more identified ground-based threats may comprise a dedicated and/or a non-dedicated processor. Optionally, the means for estimating respective locations of the one or more identified ground-based threats may be comprised of or be operative with vehicle-specific sensors and subsystems, such as navigation sensors and subsystems, communications components and circuitry (e.g., transceivers, processors, antennas, etc.), and threat location and/or bearing determining components and circuitry.

The means for defining multiple distinct threat regions associated with one or more known ground-based threats to an airborne vehicle may comprise a dedicated and/or a non-dedicated processor and corresponding circuitry. Optionally, the means for defining multiple distinct threat regions associated with one or more known ground-based threats to an airborne vehicle may comprise or be operative with one or more visual displays to show the defined threat regions.

The means for determining whether any of the defined distinct threat regions or scan patterns overlap may comprise a dedicated and/or a non-dedicated processor and corresponding circuitry. Optionally, the processor(s) and corresponding circuitry are the same as the processor(s) and circuitry of the means for defining multiple distinct threat regions associated with one or more known ground-based threats to an airborne vehicle. Alternatively, the processor(s) and circuitry may be different in whole or in part.

The means for outputting a plurality of optical impairment signals that follow scan patterns based on corresponding distinct threat regions defined by said means for defining multiple distinct threat regions may comprise a dedicated and/or non-dedicated processor, an electro-optical component, and corresponding circuitry. For example, the means for outputting a plurality of optical impairment signals may be a laser.

In one embodiment, a visual acquisition disruptor scanning system may be part of a network comprised of a plurality of vehicles, for instance. One of the vehicles of the network can have means for receiving at an airborne vehicle data regarding previously defined multiple threat regions associated with one or more known ground-based threats to another airborne vehicle. Accordingly, the another vehicle can have means for transmitting data regarding defined multiple threat regions associated with one or more known ground-based threats thereto. The means for receiving and the means for transmitting can include communication system components and circuitry, such as such as one or more transceivers (or separate transmitters and receivers), processors, antennas, etc., to receive and send, respectively, communication signals regarding scan patterns and identified threat locations. Omni-direction and/or directional communication can be employed with corresponding components and circuitry.

FIG. 1 is a block diagram a system 200 according to one or more embodiments of the invention. System 200 in FIG. 1 is shown as being implemented with a helicopter 100, for instance, a military, law enforcement, or private security helicopter. However, system 200 can be implemented with other airborne vehicles, such as an airplane, a jet, a glider, an unmanned surveillance vehicle, a blimp, or the like. For instance, system 200 may be used with an airplane or jet during takeoff and/or landing. Further, in one or more embodiments, system 200 can be implemented in or in communication with land-, space-, or water-based vehicles, such as trucks, tanks, satellites, hovercrafts, or the like.

System 200 can include a threat subsystem 202, a controller 206, and an optical countermeasure subsystem 208. Optionally, system 200 can include vehicle-specific data subsystems 204 that can receive, process, and/or output various vehicle data, such as data regarding speed, acceleration, height or altitude, location, orientation, bearing, etc. of the vehicle 100. In one or more embodiments of the invention, one or more components of the system 200 can be implemented in components already installed on the vehicle and may not require any additional hardware.

Generally, system 200 can detect or sense one or more threats using threat subsystem 202, which can identify one or more threats (e.g., ground-based), estimate respective locations of the one or more identified threats, and/or define multiple distinct threat regions associated with the estimated or known threat locations. Threat subsystem 202 which can send corresponding signals to controller 206 and/or directly to optical countermeasure subsystem 208. In response, optical countermeasure subsystem 208 can output one or more light signals, for instance laser beams, in a predetermined scan pattern associated with the detected threat or threats to interfere with the optical system of the threat. Optionally, the scan pattern or patterns can be dynamically altered in accordance with one or more parameters associated with speed, acceleration, height or altitude, location, orientation, and/or bearing, etc. of the vehicle so as to maintain an effective scan pattern for the optical countermeasures system. Further, dynamically altering the scan pattern can mean altering control signals, power, etc. for the optical countermeasure subsystem 208 so as to keep the scan pattern the same or substantially the same irrespective of the position (e.g., flight path) of the vehicle with respect to the initial deployment of the scan pattern. As will be discussed in more detail below, dynamically altering the scan pattern can also mean changing the geometry or location of the scan pattern, or modifying the intensity of the light signal or signals applied used to create the scan pattern.

Threat subsystem 202 can detect or identify an indication of optically or visually aimed ground-based threats to a vehicle or vehicles in a network. In one or more embodiments, the threat subsystem 202 can be a Hostile Fire Indicating (HFI) subsystem that can detect the presence of weapons being fired in the vicinity of the aircraft and determine whether or not the fire is hostile to the vehicle or a group or network of vehicles. For example, the HFI subsystem can detect the firing of bullets or other relatively small projectiles with a sensor that detects a muzzle flash associated with the firing of the corresponding weapon, and/or with acoustic pressure sensors, such as piezoelectric transducers that detect atmospheric disturbances created by shock waves generated by the bullet or relatively small projectile moving through the atmosphere.

The HFI system can provide bearing information, for instance, in the form of a detection line from the vehicle to the location of the threat or estimated location of the threat with respect to the vehicle at the time of firing. The HFI subsystem can estimate the location or position of the shooter by superimposing (e.g., plotting) the detected bearing line or angle of arrival (AOA) of the muzzle flash on a topographical map of the terrain of the area, for instance, and estimating an initial location for the shooter from muzzle flash intensity and terrain features, for example. The HFI subsystem can update the estimated shooter location as additional information becomes available, such as subsequent shots.

Threat subsystem 202, such as the HFI subsystem discussed above, can define or identify regions or zones indicative of the likely or estimated threat locations. Such regions or zones can define uncertainty or error regions or zones with respect to the identified or estimated threat location. The zone or region may indicate a gradient of likelihood or probability of error in the estimated location. The zone or region around the identified location can take a number of geometric forms, including a circle, a square, a rectangle, an oval, an ellipse, a triangle, an octagon, a hexagon, or an asymmetric polygon.

Data regarding the threat location or estimated threat location (e.g., the zone or region around the threat location), the detection line, and/or position of the vehicle at the time of detection can be sent to controller 206 and/or directly to optical countermeasure subsystem 208 for operation of the optical countermeasure subsystem 208 in response to the threat indication and corresponding data. Optionally, controller 206 can use the threat location data to generate a zone or region around the identified threat location. Further, optionally, in one or more embodiments, the threat location or estimated location, the detection line, and/or the position of the vehicle at the time of firing can be stored in a non-volatile memory storage unit of system 200 (not expressly shown). Further, optionally, some or all the aforementioned data may be transmitted to a location remote from the vehicle, such as another vehicle, a satellite, or a ground-based receiving station.

Controller 206 can receive data from the threat subsystem 202, the vehicle-specific data subsystems 204, and the optical countermeasure subsystem 208. Further, controller 206 can output data and/or control signals to one or more of the threat subsystem 202, the vehicle-specific data subsystems 204, and the optical countermeasure subsystem 208. Incidentally, the vehicle-specific data subsystems can include navigation, communication, weapon, control (e.g., flight control), audio and visual, etc. subsystems. For instance, one or more vehicle-specific data subsystems can provide flight parameters, such as vehicle current position; orientation; motion; altitude; weight; velocity; the acceleration; pitch, roll, and the yaw of the vehicle; speed; acceleration; etc. of the vehicle to controller 206 and/or other systems or components of the vehicle.

Generally speaking, the controller 206 can execute computer executable instructions running thereon. Controller 206 can be implemented on one or more general purpose networked computer systems, embedded computer systems, routers, switches, server devices, client devices, various intermediate devices/nodes and/or stand-alone computer systems. Controller 206 can be a computerized controller or microcontroller with a processor or processors. Further, controller 206 can include and/or be coupled to volatile and non-volatile memory. Dual microprocessors and other multi-processor architectures can also be utilized as the processor. The processor(s) and memory can be coupled by any of several types of bus structures, including a memory bus or memory controller, a peripheral bus, and a local bus using any of a variety of bus architectures. The memory can include read only memory (ROM) and random access memory (RAM), for instance. Optionally, controller 206 or system 200 in general can include one or more types of long-term data storage units, including a hard disk drive, a magnetic disk drive, (e.g., to read from or write to a removable disk), and an optical disk drive, (e.g., for reading a CD-ROM or DVD disk or to read from or write to other optical media). The long-term data storage can be connected to the controller by an interface. Optionally or alternatively, some or all of the data storage may be internal of the controller 206 and can be coupled to the processor(s) by a drive interface or interfaces. The long-term storage components can provide nonvolatile storage of data, data structures, and computer-executable instructions for the controller 206 and more specifically the processor(s) of the controller 206. A number of program modules may also be stored in one or more of the drives as well as in the RAM, including an operating system, one or more application programs, other program modules, and program data.

Optical countermeasure subsystem 208 can be an optical disruption or disabling subsystem that can temporarily disable or disorient an optical system of a threat, such as a human firing an optically aimed or trained weapon. The optical countermeasure subsystem 208 can generate and output a plurality of light signals, for instance, projected laser beams of sufficient intensity to interfere with the targeting of an optically aimed weapon system when its associated targeting modality (e.g., a sensor or human eye) is within the path of the beam or scan pattern, zone, or area of the beam. Such generation and output can be based on or in response to data received from threat subsystem 202 and/or controller 206. Optionally, the countermeasure subsystem 208 can output light signals at detected or determined or estimated threat locations or zones only and not at locations or zones not determined or estimated to be threatening.

Thus, the optical countermeasure subsystem 208, optionally, may be a laser-based subsystem that can transmit one or more laser beams to disrupt or interfere with the visual targeting capability of individuals firing small arms weapons (i.e., shooters), for instance. The laser beams may be non-lethal and eye-safe, intended only to temporarily blind or disorient a target or targets, for example.

In one or more embodiments, the optical countermeasure subsystem 208 can be a dazzler that emits infrared or invisible light against various electronic sensors and visible light against human optical systems. Optionally, the light may be emitted by a laser.

Alternatively, in one or more embodiments, the optical countermeasure subsystem 208 can be a Visual Acuity Disruptor (VAD) subsystem. Generally speaking, the VAD subsystem can generate and output laser beams whose energy is aimed at a hostile shooter to disrupt his ability to aim. The VAD subsystem also can be an eye-safe system. More specifically, the VAD subsystem can radiate one or more laser beams (e.g., in sequence or simultaneously) with sufficient power to temporarily impair the visual acuity of a shooter, which can cause the shooter to see spots or lingering after images for a predetermined period of time after being illuminated by the laser. The laser beams of the VAD subsystem can be moved in predetermined patterns, such as a raster scan pattern, to account for errors resulting from the flight environment of the VAD subsystem (e.g., platform vibration and flight maneuvers) and errors associated with the location of the shooter. The predetermined radiation pattern can temporarily impair the eyesight of individuals within an area in the vicinity of the location of the shooter, including the shooter. Thus, the VAD subsystem can engage and counter multiple shooters (i.e., threats) at different positions because the temporary impairment of the shooter's visual acuity lingers. The impairment of visual acuity caused by the VAD subsystem can be temporary, depending upon the power level or intensity of the laser beam signal and the amount of time exposed to the laser.

As indicated earlier, the optical countermeasure subsystem 208 can generate and output optical impairment signals, such as light signals, in a particular scan pattern responsive to received platform sensing data, such as data from threat subsystem 202. The scan patterns can be projected on the ground in association with previously defined or identified regions or zones indicative of the likely or estimated threat locations. Further, the corresponding scan patterns of the output light signals associated with the zone or region can completely envelope the zone or region. Optionally, the scan patterns can take a different shape from the location zone or region, but can still envelope or encompass the entire zone or region. For instance, the scan patterns can take a square or rectangular shape, whereas the threat location or zones can be in the form of ellipses. The scan patterns can be controlled by optical countermeasure subsystem 208, informed by the controller 206, for instance, such that each initial scan pattern is maintained in its original form irrespective of current vehicle position. Further, multiple scan patterns (e.g., two, three, four, five, ten) may be maintained at once. Scan patterns other than square or rectangular also can be generated and output, including oval, circular, ellipse, triangular, octagonal, a hexagonal, or asymmetric polygonal. The scan patterns can be maintained irrespective of aircraft parameters, such as location, positioning, speed, etc.

Optionally, the system 200 can be configured and operative to determine whether any of the two or more scan patterns maintained at the same time overlap or have a common portion or portions, and to increase applied light energy for any overlapping portion. Optionally or alternatively, the system 200 may be configured and operative to determine whether any of the two or more known threat location zones or regions overlap either each other or a deployed or soon-to-be deployed scan pattern of the optical countermeasure subsystem 208. Optionally, controller 206 can perform overlapping determinations. Again, if an overlap condition exists, the system 200, through optical countermeasure system 208, can increase an amount of energy (e.g., light energy) for any overlapping portion. Optionally, the system 200 can increase the amount of light energy only for overlapping portions. Increasing the amount of light energy can include increasing scanning frequency of one or more light signals generated and output from the optical countermeasure subsystem 208 and/or increasing the intensity of one or more light signals generated and output from the optical countermeasure subsystem 208. Incidentally, an overlap as set forth herein can indicate a single threat to the vehicle for the associated scan patterns or identified locations, zones or regions.

Optionally, system 200 can be configured and operative to keep a same amount of light energy applied to any non-overlapping portion, to reduce an amount of applied light energy for any non-overlapping portion, and/or to cease application of light energy for any non-overlapping portion, effectively changing the scan pattern or patterns of the optical countermeasure subsystem 208.

Optical impairment signals from the optical countermeasure system 208 can be output sequentially or simultaneous along a travel path (e.g., a flight path) of a vehicle. That is, one or more optical impairment signals, such as laser light signals, can be output simultaneously at one position of the vehicle in the travel path, and then one or more optical impairment signals can be output at a later time, for instance, at a different position of the vehicle in the travel path.

Optionally, in one or more embodiments of the invention system 200 can also include other directed-energy weapons that may be employed in conjunction with or as an alternative to the optical disruption subsystem 208. Such other directed-energy weapons can include sonic, or ultrasonic weapons, active denial weapons (ADSs), heat rays, or the like.

FIGS. 2A-2F show an example of an operational situation for the system 200 and helicopter 100 of FIG. 1.

Figure 2A:
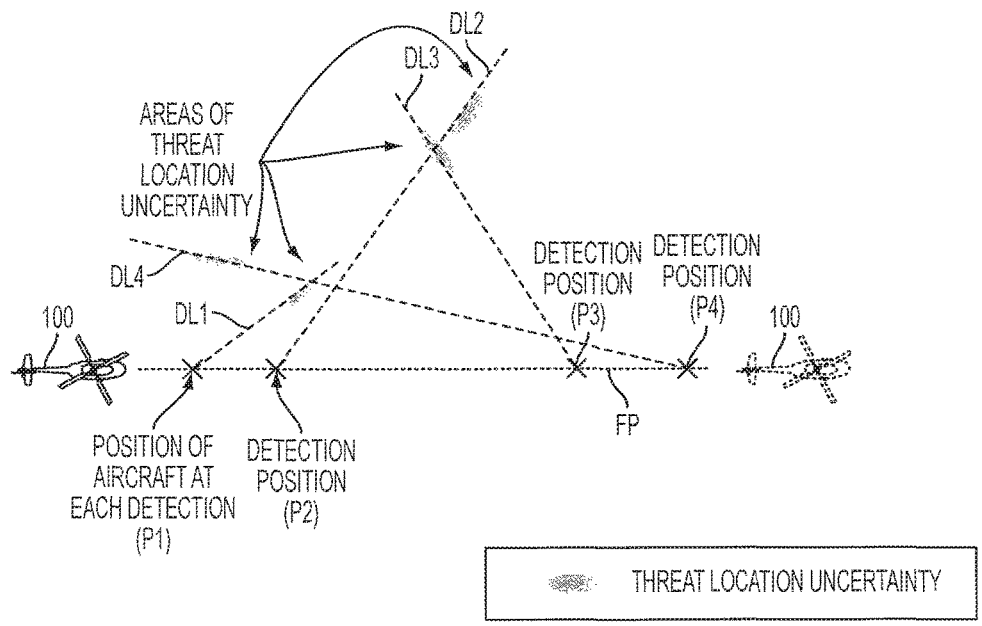
FIGS. 2A-2F show an example of an operational situation for the system of FIG. 1.

As shown in FIG. 2A, helicopter 100 travels along a flight path FP from left to right. Though the flight path FP shown in FIGS. 2A-2F is linear, other flight paths can be taken. Further, flight path can also include a stationary position of the helicopter 100 over time. FIG. 2A shows a plurality of positions P1-P4 of the helicopter 100 indicated by an 'X' at which the helicopter 100, via system 200, detects hostile fire, for instance, via a threat subsystem as shown and described herein. The helicopter 100 can determine a detection or flash line DL1-DL4 associated with each weapon firing. Based at least on the detection line, the helicopter 100 can determine a location or likely location for the threat. Optionally, the helicopter 100 can generate or identify corresponding threat location uncertainty areas or zones that introduce an amount of uncertainty or error in the location of the threat. As can be seen in FIG. 2A, for instance, the threat location uncertainty areas may be in the form of ellipses.

Figure 2B:
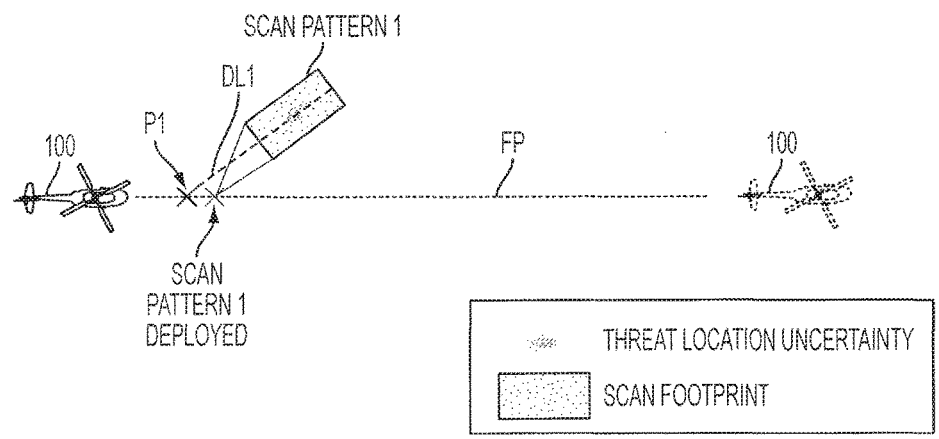

Referring now to FIG. 2B, helicopter 100 travels along flight path FP when at P1 a threat fires an optically aimed or trained weapon at the helicopter 100. The helicopter 100 can detect the occurrence of the threat and ascertain a detection line DL1, for instance. The detection line DL1 can be used to identify a position or likely position of the threat. Alternative or additional threat detection indicators may be employed, such as acoustical-, visual-, or heat-based threat subsystems. The identification of the position or likely position of the threat can include a threat uncertainty region or zone. Shortly (e.g., almost instantaneously) after detecting the threat, and in response thereto, helicopter 100 can deploy an optical impairment signal from an optical countermeasure subsystem, such as a VAD subsystem, onboard the helicopter 100. The optical impairment signal can be deployed in the form of a ground-projection that completely envelopes the threat location uncertainty area or zone. As an example, the optical impairment signal can be deployed according to scan pattern 1 shown in FIG. 2B. The helicopter 100 may continue along the flight path FP while continuing or maintaining the scan pattern 1 over the corresponding threat location uncertainty area or zone. Optionally, the shape (i.e., rectangle) of scan pattern 1 may remain the same, irrespective of the current position or travel characteristics of the helicopter 100.

Figure 2C:
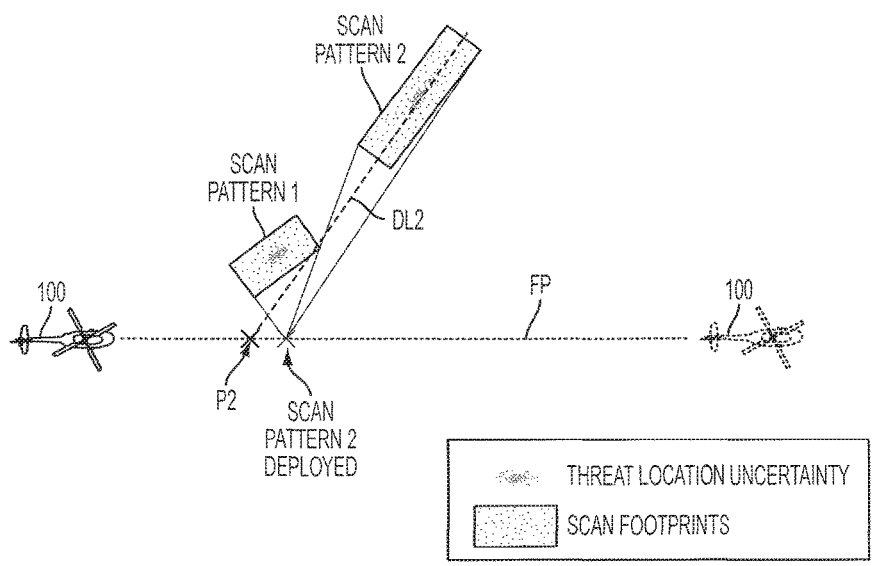
Figure 2D:
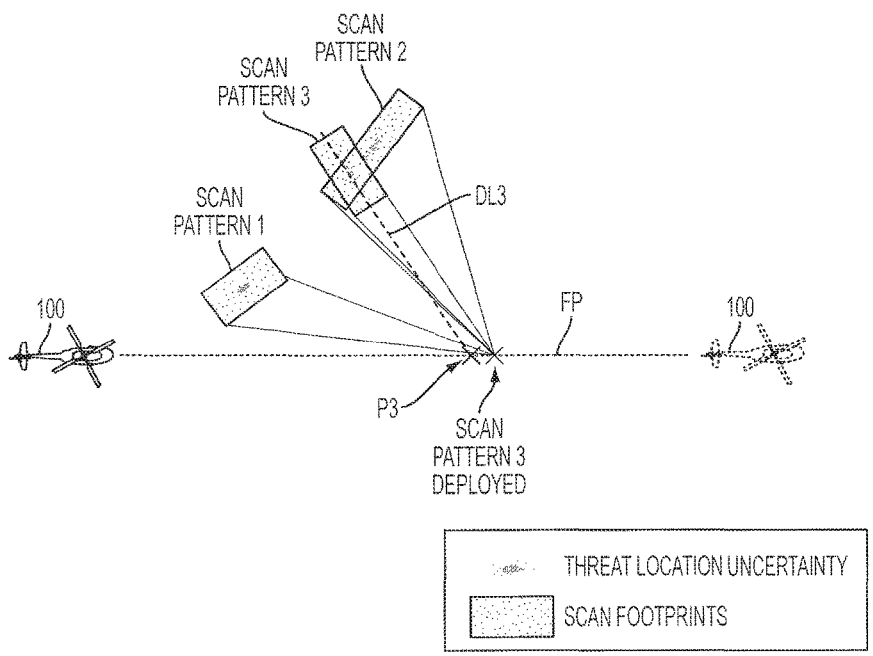
Figure 2E:
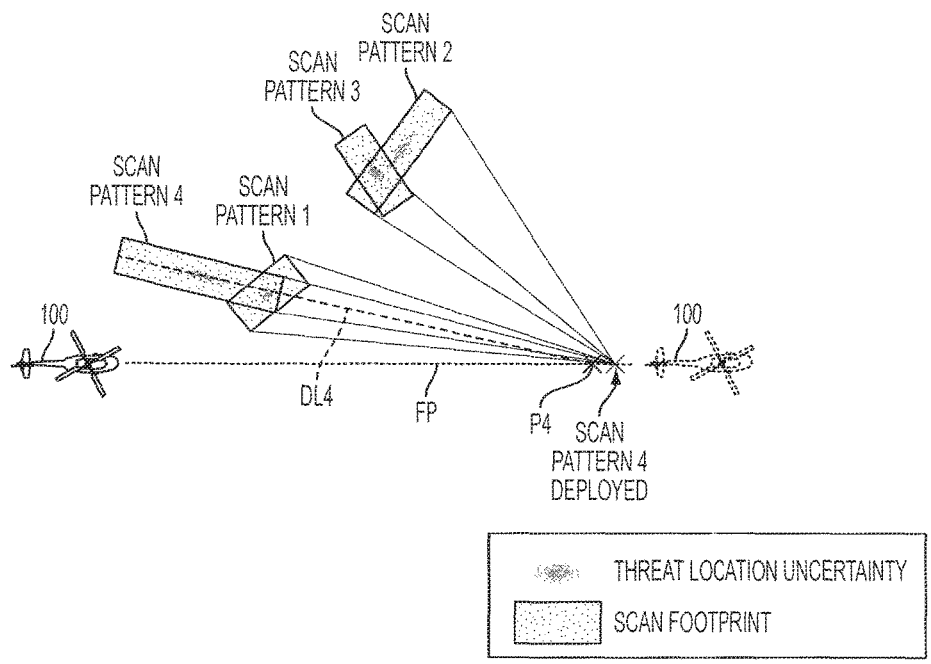
Figure 2F:
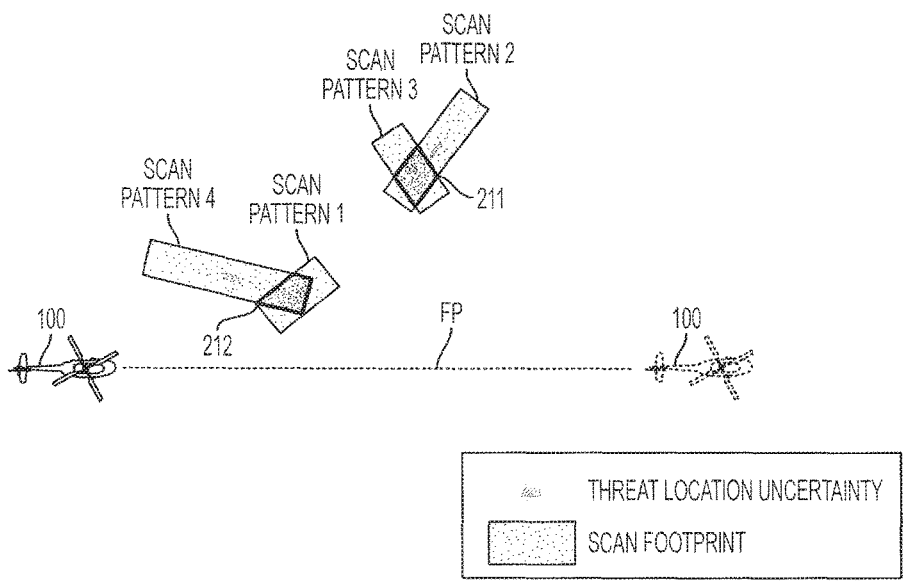

Moving to FIGS. 2C, 2D, and 2E, the helicopter 100 continues along flight path FP and detects additional occurrences of threats at positions P2-P4, ascertains corresponding detection lines DL2-4, for instance, and identifies positions or likely positions of the threat with corresponding threat location uncertainty patterns. In response to each detection, shortly thereafter (again, substantially instantaneously) and in response thereto, helicopter 100 can automatically deploy optical impairment signals in respective scan patterns 2-4. The helicopter 100 may continue along the flight path FP while continuing or maintaining the scan patterns 1-4 over the corresponding threat location uncertainty areas or zones. Optionally, the shape (i.e., rectangle) of scan patterns 1-4 may remain the same, irrespective of the current position or travel characteristics of the helicopter 100.

Each overlapping area or portion of the scan patterns 1-4 and/or threat location uncertainty area or zone might be in indication of a single threat. Accordingly, helicopter 100 can identify overlapping areas or portions, for instance areas 211 and 212 in FIG. 2F, and increase the amount of energy (e.g., light energy) applied to the overlapping area or portion. For instance, the amount of energy can be increased by increasing a scanning frequency of light signals, such as laser beams, applied to the overlapping area or portion, and/or increasing the intensity of the signal or signals applied to the overlapping area or portion. As an example, overlapping areas may be scanned twice per scan cycle.

Accordingly, in one or more embodiments, the helicopter 100 and corresponding systems, methods, and computer program products can automatically weight the area or areas of most probable threat location or locations by scanning those areas more frequently, for example. Thus, systems, methods, computer program products, and networks thereof can apply more energy in a region or are with the highest probability of shooter location.

Figure 3:
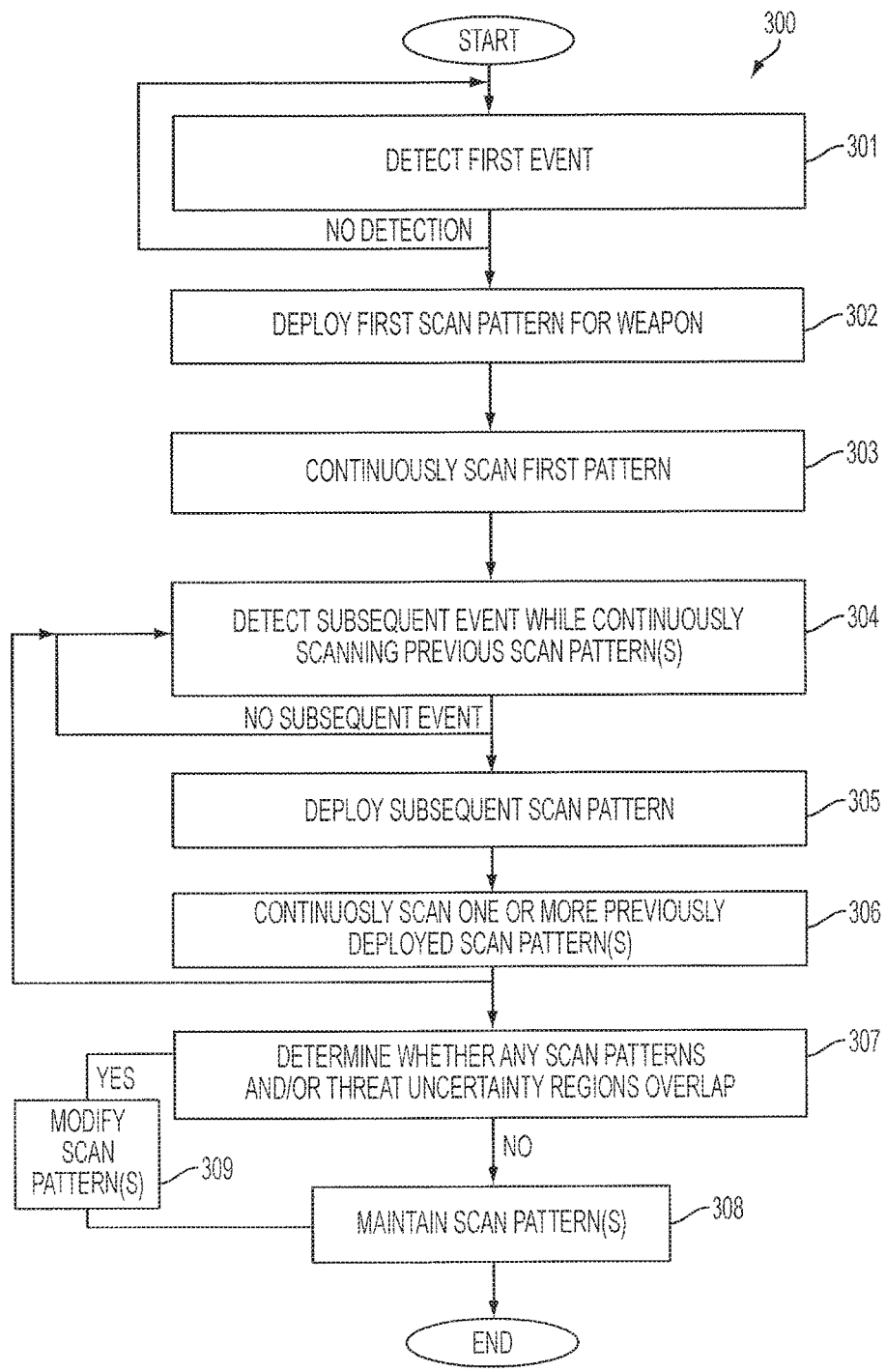
FIG. 3 is a flow chart for a method according to one or more embodiments of the invention.

In view of the foregoing structural and functional features described above, a method 300 in accordance with one or more embodiments of the invention will now be described with respect to FIG. 3. While, for purposes of simplicity of explanation, the methodology of FIG. 3 is shown and described as executing serially, it is to be understood and appreciated that the invention is not limited by the illustrated order, as some aspects or steps could, in accordance with the present invention, occur in different orders and/or concurrently with other aspects from that shown and described herein. Moreover, not all illustrated features may be required to implement a method or methods in accordance with one or more embodiments of the invention.

Generally speaking, method 300 is a visual acquisition disruption scan pattern method that can electronically identify a common or overlapping portion of at least two different flash detection areas and/or scan patterns. Responsive to the electronic identification, the method can apply in scanning fashion, for instance, an increased amount of energy to the common or overlapping portion.

Method 300 can continuously loop at 301 in order to detect or identify an occurrence of a first event, such as a threat firing an optically aimed or trained weapon at a vehicle. The detection or identification can be electronically using a threat subsystem as shown and described herein, for instance. In response to the detection of the first event, an optical impairment signal or signals can be deployed around an area or zone associated with the determined location or likely location of the threat 302. Optionally, the optical impairment signal or signals can be deployed in a scan pattern as shown and described herein. Further, the output of the optical impairment signal or signals, for instance, the scan pattern, can be held or maintained (i.e., the scanning can be continuous) in time and/or irrespective of position of the vehicle 303.

The method can further continuously monitor for subsequent events for detection or identification 304. Responsive to detection of subsequent events, subsequent optical impairment signals can be output, for instance, around an area or zone associated with the determined locations or likely locations of the threats, optionally in associated scan patterns 305. As with the initial optical impairment signal or signals, subsequent optical impairment signals may be held or maintained 306. At 307, the method can determine whether any of the scan patterns and/or threat uncertainty regions overlap. If so, the scan pattern may be modified 309, otherwise, the scan patterns may be maintained as is 308. Scan pattern modification can include modifying the geometry of one or more scan patterns, for instance, to reduce the scan pattern only to the overlapping area, and/or it can mean modifying an amount of energy applied to a particular area or region. For instance, the amount of energy may be increased for any overlapping area or region, but may be held the same, decreased, or even stopped for other, non-overlapping areas or zones. In one or more embodiments the method can output a modified scanning pattern (i.e., increasing the amount of energy applied to a certain area, for instance, an overlapping area) before outputting any previous scan patterns or only after outputting one scan pattern. Such a case may indicate that multiple threat indications were detected close in succession and rather than outputting multiple scan patterns and then modifying the scan pattern, the scan pattern was in effect pre-modified before being output.

Figure 4:
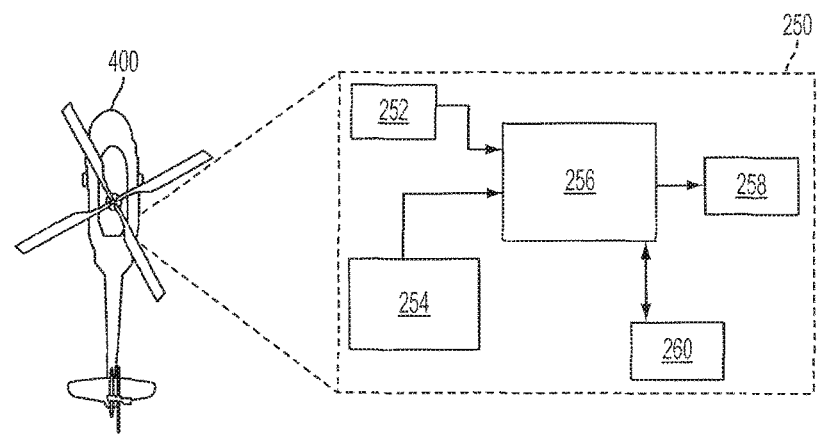
FIG. 4 is a block diagram of a system according to one or more embodiments of the invention.
Figure 5:
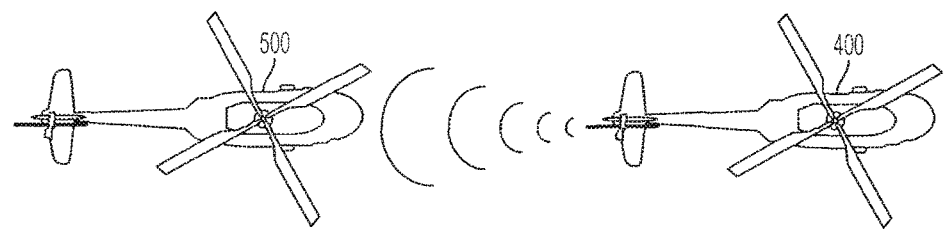
FIG. 5 shows a network according to one or more embodiments of the invention involving at least two vehicles.

FIG. 4 is a block diagram of a system 250 according to one or more embodiments of the invention implemented with a helicopter 400. System 250 is similar to system 200 associated with FIG. 1 and helicopter 100 and includes a threat subsystem 252, a controller 256, an optical countermeasure subsystem 258, and vehicle-specific data subsystems 254. System 250, however, additionally includes a threat communication element 260. Threat communication element 260 can send and/or receive data regarding detected threats, their associated locations and uncertainty areas or zones, and corresponding scan patterns, for instance, deployed by optical countermeasure subsystem 258. Optionally, communication element 260 can send such data to another helicopter 500 in a network of helicopters or other vehicles. FIG. 5 shows helicopter 400 sending data regarding detected threats, their associated locations and uncertainty areas or zones, and corresponding scan patterns, for instance, deployed by optical countermeasure subsystem 258 on board 400. Thus, helicopter 500, which can also include at least optical countermeasure subsystem 258 and communication element 260 can, without having to detect threat occurrences, deploy some or all of the scan patterns or modifications already deployed by the helicopter 400. Of course the second helicopter 500 also may send data regarding detected threats, their associated locations and uncertainty areas or zones, and corresponding scan patterns to helicopter 400.

Figure 6:
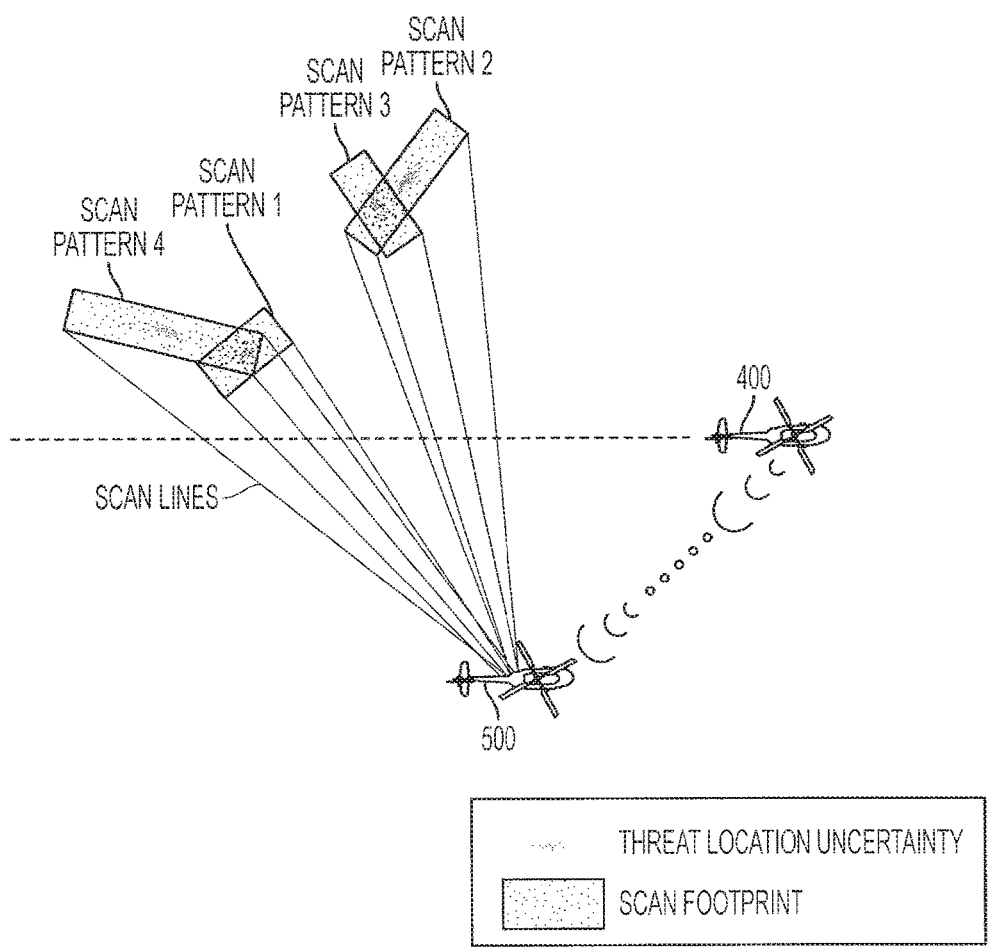
FIG. 6 shows an example of an operational situation for the network of FIG. 5.

FIG. 6 shows an operational example for the network of helicopters 400, 500 shown in FIG. 5. Though FIGS. 5 and 6 show two helicopters 400, 500, the network may be comprised of additional helicopters or other vehicles or non-vehicles, such as a ground base station.

Helicopter 400 travels along a first flight path, deploying four scan patterns. The helicopter 400 can transmit scan pattern data to helicopter 500 and the helicopter 500 can output the same scan patterns as already output by helicopter 400. Thus, helicopter 500 does not necessarily need to detect threats and identify their locations before outputting one or more scan patterns. Further, helicopter 500 can output a modified scan pattern, for instance, with increased energy for a particular region or zone, simply based on data received from helicopter 400 and optionally without any additional information. Alternatively, helicopter 500 can output optical impairment signals based on its own threat detection and analysis in combination with data from helicopter 400. Optionally, one or more optical impairment signals output from each helicopter 400, 500 may be used to increase an amount of energy for a particular area or zone.

Figure 7:
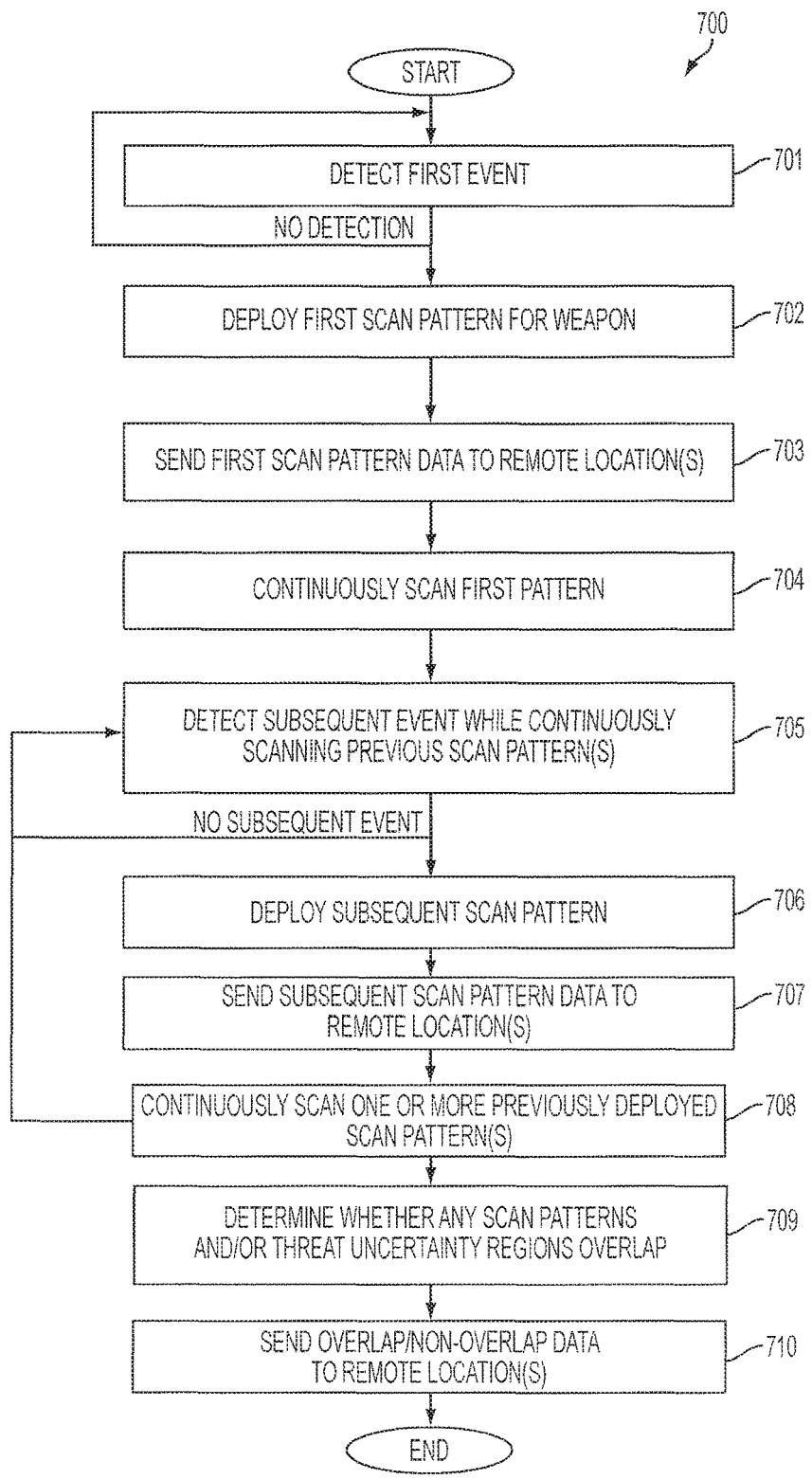
FIG. 7 is a flow chart for a method according to one or more embodiments of the invention.

In view of the foregoing structural and functional features described above, a method 700 in accordance with one or more embodiments of the invention will now be described with respect to FIG. 7. While, for purposes of simplicity of explanation, the methodology of FIG. 7 is shown and described as executing serially, it is to be understood and appreciated that the invention is not limited by the illustrated order, as some aspects or steps could, in accordance with the present invention, occur in different orders and/or concurrently with other aspects from that shown and described herein. Moreover, not all illustrated features may be required to implement a method or methods in accordance with one or more embodiments of the invention.

Generally speaking, method 700 can be a visual acquisition disruption scan pattern method. The method can include electronically receiving, from a remote location, information regarding a common or overlapping portion of at least two different previously identified flash detection areas or scan patterns. Responsive to the electronic reception, the method 700 can automatically apply in scanning fashion, for instance, an amount of laser energy to the common or overlapping portion.

Method 700 can continuously loop at 701 in order to detect or identify an occurrence of a first event, such as a threat firing an optically aimed or trained weapon at a vehicle. The detection or identification can be electronically using a threat subsystem as shown and described herein, for instance. In response to the detection of the first event, an optical impairment signal or signals can be deployed around an area or zone associated with the determined location or likely location of the threat 702. Optionally, the optical impairment signal or signals can be deployed in a scan pattern as shown and described herein. Data regarding the scan pattern, the location or likely location of the threat, and/or the threat uncertainty area may be transmitted to a remote location or locations, for instance, to another vehicle or vehicles in a network of vehicles 703. Further, the output of the optical impairment signal or signals, for instance, the scan pattern, can be held or maintained (i.e., the scanning can be continuous) in time and/or irrespective of position of the vehicle 704. The method can further continuously monitor for subsequent events for detection or identification 705. Responsive to detection of subsequent events, subsequent optical impairment signals can be output, for instance, around an area or zone associated with the determined locations or likely locations of the threats, optionally in associated scan patterns 706. Data regarding the subsequent scan patterns, the locations or likely locations of the corresponding threats, and/or the threat uncertainty areas may be transmitted to the remote location or locations 707. As with the initial optical impairment signal or signals, subsequent optical impairment signals may be held or maintained 708. At 709, the method can determine whether any of the scan patterns and/or threat uncertainty regions overlap. If so, such overlap data can be sent to the remote location or locations 710. In response to the received data, vehicles at the remote locations can take further action, such as taking evasive maneuvers to avoid the hostile threat locations, deploying optical impairment signals, or even deploying "hard-kill" weaponry.

It will be appreciated that portions (i.e., some, none, or all) of the circuits, circuitry, modules, processes, sections, systems, and system components described herein can be implemented in hardware, hardware programmed by software, software instructions stored on a non-transitory computer readable medium or a combination of the above.

For example, the processor can include, but is not be limited to a computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or storage device which may be any suitable memory apparatus, such as, but not limited to ROM, PROM, EEPROM, RAM, flash memory, disk drive and the like.

Furthermore, the circuits, circuitry, modules, processes, systems, sections, and system components can be implemented as a single processor or as a distributed processor. Further, it should be appreciated that the steps mentioned above may be performed on a single or distributed processor (single and/or multi-core). Also, the processes, modules, and sub-modules described in the various figures of and for embodiments above may be distributed across multiple computers or systems or may be co-located in a single processor or system. Exemplary structural embodiment alternatives suitable for implementing the circuits, circuitry, modules, sections, systems, system components, means, or processes described herein are provided below.

The circuits, circuitry, modules, processors, systems, or system components described herein can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the user interface and/or computer programming arts.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

What is claimed is:

1. A visual acquisition disruptor scan pattern method, comprising:

electronically receiving, from a first vehicle at a remote location, information at a second vehicle regarding a common portion of at least two different previously identified flash detection areas; and responsive to said electronically receiving, automatically increasing laser energy from a first intensity to a second intensity, the laser energy being applied from at least one of first vehicle and the second vehicle in scanning fashion to the common portion.

2. The visual acquisition disruptor scan pattern method according to claim 1, further comprising:

increasing scanning frequency of the laser energy.

3. The visual acquisition disruptor scan pattern method according to claim 1, further comprising:

electronically receiving, from the remote location, information regarding a plurality of different flash detection areas including said at least two different previously identified flash detection areas; and deploying a plurality of different laser scan patterns corresponding to said plurality of different flash detection areas, a number of the different flash detection areas matching a number of the different laser scan patterns, and each laser scan pattern enveloping its corresponding flash detection area.

4. The visual acquisition disruptor scan pattern method according to claim 3, wherein the plurality of different laser scan patterns are deployed simultaneously or substantially simultaneously from the first and second vehicles, and wherein the plurality of different laser scan patterns are maintained substantially for a same amount of time.

5. The visual acquisition disruptor scan pattern method according to claim 1, responsive to said electronically receiving, maintaining the laser energy at only the first intensity to any uncommon portion of the at least two different previously identified flash detection areas.

6. The visual acquisition disruptor scan pattern method according to claim 1, wherein the first and second intensity of laser energy to the common portion are each an amount sufficient to interfere with an optical system of a weapon or an optical system of a person.

7. The visual acquisition disruptor scan pattern method according to claim 1, wherein the remote location is associated with one of a ground-, water-, space-, or air-based vehicle.

8. The visual acquisition disruptor scan pattern method according to claim 1, further comprising:

responsive to said electronically receiving, applying the laser energy at only the first intensity to any uncommon portion of the at least two different previously identified flash detection areas.

9. The visual acquisition disruptor scan pattern method according to claim 1, further comprising:

responsive to said electronically receiving, reducing the laser energy applied to any uncommon portion of the at least two different previously identified flash detection areas from the first intensity to a third intensity during said increasing of the laser energy to the common portion.

10. The visual acquisition disruptor scan pattern method according to claim 1, further comprising:

identifying locations of stationary or moving ground-based threats to the first vehicle based on the at least two different previously identified flash detection areas; and generating respective ground-projection zones around the identified locations, the ground-projection zones being indicative of possible error in the identified locations.

11. The visual acquisition disruptor scan pattern method according to claim 8, wherein the stationary or moving ground-based threats are human beings firing any one of a rocket-propelled grenade (RPG), anti-aircraft artillery (AAA), and small arms fire at the first vehicle.

12. The visual acquisition disruptor scan pattern method according to claim 8, wherein the respective ground-projection zones around the identified locations are defined based on respective positions along a path of the first vehicle at which hostile fire associated with the stationary or moving ground-based threats occurred.

* * * * *